United States Patent
Davies et al.

(10) Patent No.: US 6,718,323 B2
(45) Date of Patent: Apr. 6, 2004

(54) AUTOMATIC METHOD FOR QUANTIFYING THE RELEVANCE OF INTRA-DOCUMENT SEARCH RESULTS

(75) Inventors: Liam Clement Davies, Annerley (AU); Matthew Thomas Moores, Mudgeeraba (AU)

(73) Assignee: Hewlett-Packard Development Company, L.P., Houston, TX (US)

( * ) Notice: Subject to any disclaimer, the term of this patent is extended or adjusted under 35 U.S.C. 154(b) by 154 days.

(21) Appl. No.: 09/759,944

(22) Filed: Jan. 12, 2001

(65) Prior Publication Data

US 2002/0095404 A1 Jul. 18, 2002

Related U.S. Application Data

(60) Provisional application No. 60/234,105, filed on Sep. 21, 2000, and provisional application No. 60/223,821, filed on Aug. 9, 2000.

(51) Int. Cl.[7] .............................................. G06F 17/30
(52) U.S. Cl. ................... 707/5; 707/3; 707/10; 707/100; 707/104.1; 707/201; 707/206
(58) Field of Search .......................... 707/5, 1, 3, 513, 707/100, 22, 501.1, 103, 6, 102, 2, 104.1, 201, 10; 704/1.5, 270; 705/26, 36

(56) References Cited

U.S. PATENT DOCUMENTS

| | | | | |
|---|---|---|---|---|
| 5,963,940 A | * | 10/1999 | Liddy et al. | 707/5 |
| 6,282,538 B1 | * | 8/2001 | Woods | 707/5 |
| 6,532,469 B1 | * | 3/2003 | Feldman et al. | 707/102 |

\* cited by examiner

*Primary Examiner*—Shahid Alam
*Assistant Examiner*—Fred Ehichioya

(57) ABSTRACT

A method for finding and ranking portions of documents responsive to a query is disclosed. The method comprises the steps of: providing at least one database containing documents; providing a query relating to information sought by a user, the query containing at least one search term; assigning a value to each document responsive to at least one search term contained in the query indicating the relevance of the document; defining regions within the documents, each region corresponding to a selected one of the search terms; assigning a value to each region responsive to at least one search term contained in the query indicating the relevance of the region; and displaying at least one region of at least one document in order of relevance.

34 Claims, 6 Drawing Sheets

AUTOMATIC METHOD FOR QUANTIFYING THE RELEVANCE OF INTRA-DOCUMENT SEARCH RESULTS

This application claims the benefits of U.S. provisional Application Ser. No. 60/234,105, filed Sep. 21, 2000, and U.S. Provisional Application Ser. No. 60/223,821, filed Aug. 9, 2000, both of which entitled "AUTOMATIC METHOD FOR QUANTIFYING RELEVANCE OF INTRA-DOCUMENT SEARCH RESULTS."

FIELD OF THE INVENTION

The present invention generally relates to information retrieval from documents and, more particularly, to the calculation of the relevance of the documents or portions thereof obtained from an automated search.

BACKGROUND OF THE INVENTION

Many methods are currently available to search databases for documents relevant to a query posed by a user seeking information. The most common type of query-based search methodology capable of locating portions of documents requires the ranking of arbitrary sub-documents contained within a group of documents. Such a methodology involves arbitrarily defining groups of sub-documents, processing a query on the sub-documents to generate scores and retrieving sub-documents having the best (i.e., highest) scores. Scores are determined by the total number and value of each query term contained within a sub-document.

A problem associated with conventional document search methods is that they are not capable of locating regions within documents that are relevant to a search query. Instead conventional search methodologies only rank "sub-documents," whose relevance are then determined arbitrarily at a later time.

Another problem associated with conventional document search methods is that they only rank pre-defined sub-documents. They are not capable of defining regions of documents based on the location of query search terms contained within a document.

Yet another problem associated with conventional document search methods is that they are not capable of taking the repetition of identical search terms in a particular document region into account when determining the relevance of a document. Instead, conventional search method simply increase the score of a sub-document based on the total number or value of all terms contained in a sub-document.

Yet another problem associated with conventional document search methods is that they are not capable of returning approximate phrase matches. Instead, conventional search methods are only capable of returning exact phrase matches, and are not capable of compensating for noisy speech or inaccurate transcripts.

SUMMARY OF THE INVENTION

The aforementioned and related drawbacks associated with conventional document retrieval analysis and methods are substantially reduced or eliminated by the present invention. The present invention is directed to a method for defining regions of documents based on the location of query search terms contained within a document. The method includes ranking regions of documents, taking the repetition of identical search terms as well as the relative importance of distinct search terms within a region into account when determining the relevance of a region.

According to an exemplary embodiment, the method for finding and ranking portions of documents responsive to a query comprises the steps of: providing at least one database containing documents; providing a query relating to information sought by a user, the query containing at least one search term; assigning a value to each document responsive to at least one search term contained in the query indicating the relevance of the document; defining regions within the document, each region corresponding to a selected one of the search terms; and assigning a value to each region responsive to at least one search term contained in the query indicating the relevance of the region. After the relevant documents have been assigned a value, they are provided to the user in order of relevance.

An advantage provided by the present invention is that it is capable of locating regions within documents that are relevant to a search query.

Another advantage provided by the present invention is that it is capable of defining regions of documents based on the location of query search terms contained within a document.

Yet another advantage provided by the method of the present invention is that it is capable of taking the repetition of identical search terms in a region into account when determining the relevance of a document, or a particular region thereof.

Yet another advantage provided by the method of the present invention is that it is capable of returning approximate phrase matches, in order to compensate for noisy speech or inaccurate transcripts.

BRIEF DESCRIPTION OF THE DRAWINGS

The aforementioned and related advantages and features of the present invention will become apparent upon review of the following detailed description of the invention, taken in conjunction with the following drawings, where like numerals represent like elements, in which.

DETAILED DESCRIPTION OF THE INVENTION

Figure 1:
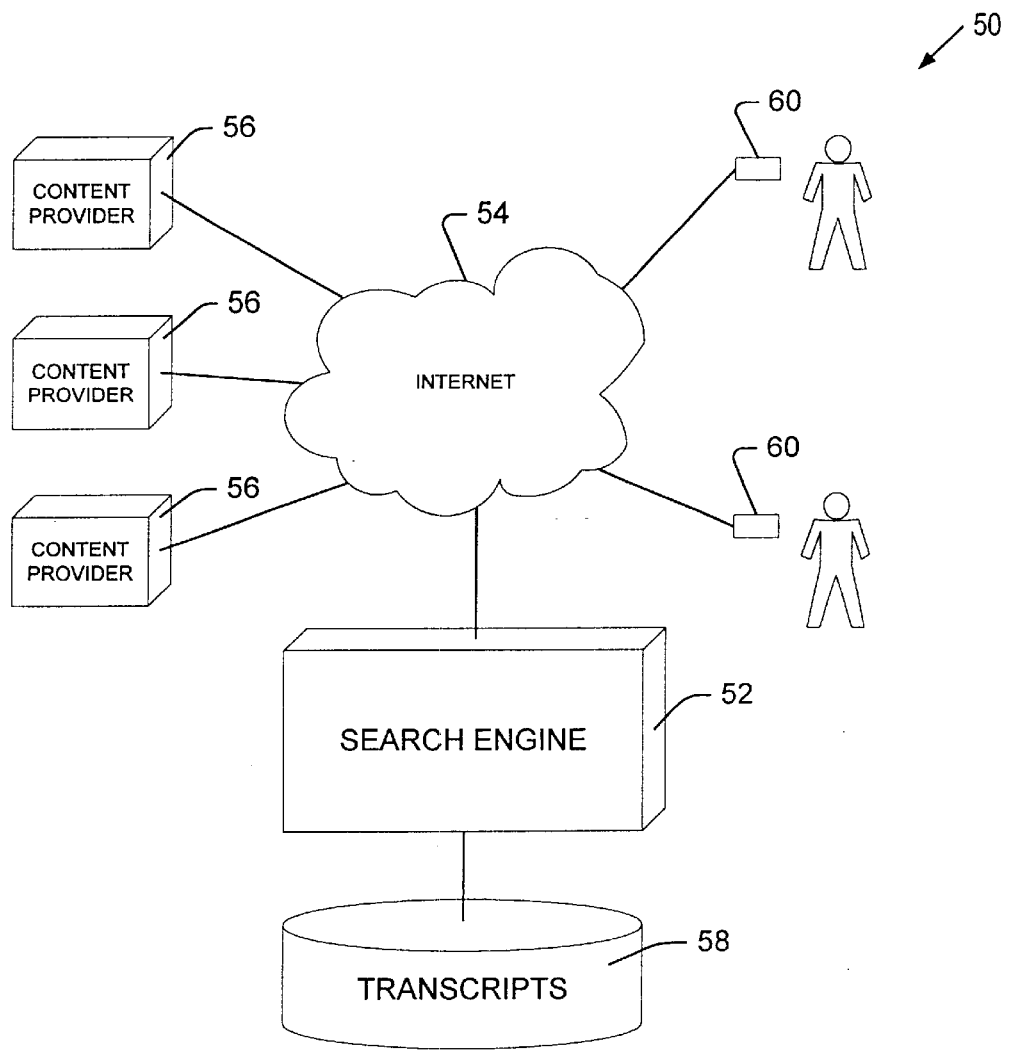
FIG. 1 is a block diagram illustrating a system for retrieving relevant regions of documents according to an exemplary embodiment of the present invention.

FIG. 1 illustrates a system 50 for retrieving relevant regions of documents according to an exemplary embodiment of the present invention. Referring to FIG. 1, a search engine 52 receives audio content in the form of streaming audio from various content providers 56 through the Internet 54. Content providers 56 may be radio shows or other entities who allow access to audio recordings through Internet web sites or other communication means. The search engine 52 uses a speech recognition system that transcribes the audio recordings into text format, and then stores the text at storage medium 58 as computerized transcripts. The storage medium 58 may take the form of recorded compact disks, magnetic hard disk storage, or any other suitable electronic storage medium.

To perform searches on the stored transcripts, a user enters a query through the Internet 54, using a personal computer 60. The query should contain search terms relating to information the user is seeking. The search engine 52 searches the storage device 58 for transcripts containing at least one of the search terms contained in the query. In an exemplary embodiment, the search engine 52 searches an index of the transcripts in order to determine the location of search terms, without searching the transcripts themselves. This index search is performed by any of the means known in the art.

The search engine 52 ranks the transcripts by the number and importance of the search terms contained within each transcript. The search engine 52 then selects a group of transcript documents that are most relevant to the query. In an exemplary embodiment, the search engine 52 selects the 200 most relevant documents. The ranking and selection of documents will be described in greater detail bellow.

The search engine 52 then searches for occurrences of the search terms in each of the selected transcripts. The search engine 52 defines a region within each transcript where a search term is located. In an exemplary embodiment, each defined region includes the search term and the next 30 words following such search term. The search engine 52 then ranks each region by the regions relevance to the query. This ranking process is discussed in greater detail below. The search engine 52 transmits the most relevant regions to the personal computer 60. The personal computer 60 then displays the regions in order of relevance. In an exemplary embodiment, the 20 most relevant regions are displayed to the user in order of relevance rank, with the highest ranking region being displayed first. The personal computer 60 provides a direct link to the content provider associated with each region being displayed, thereby allowing the user direct access to the audio recordings corresponding to a selected region through the Internet 54. The user may then choose to hear a portion of the audio recording associated with a particular region directly from the content provider 56 through the Internet 54.

Figure 2:
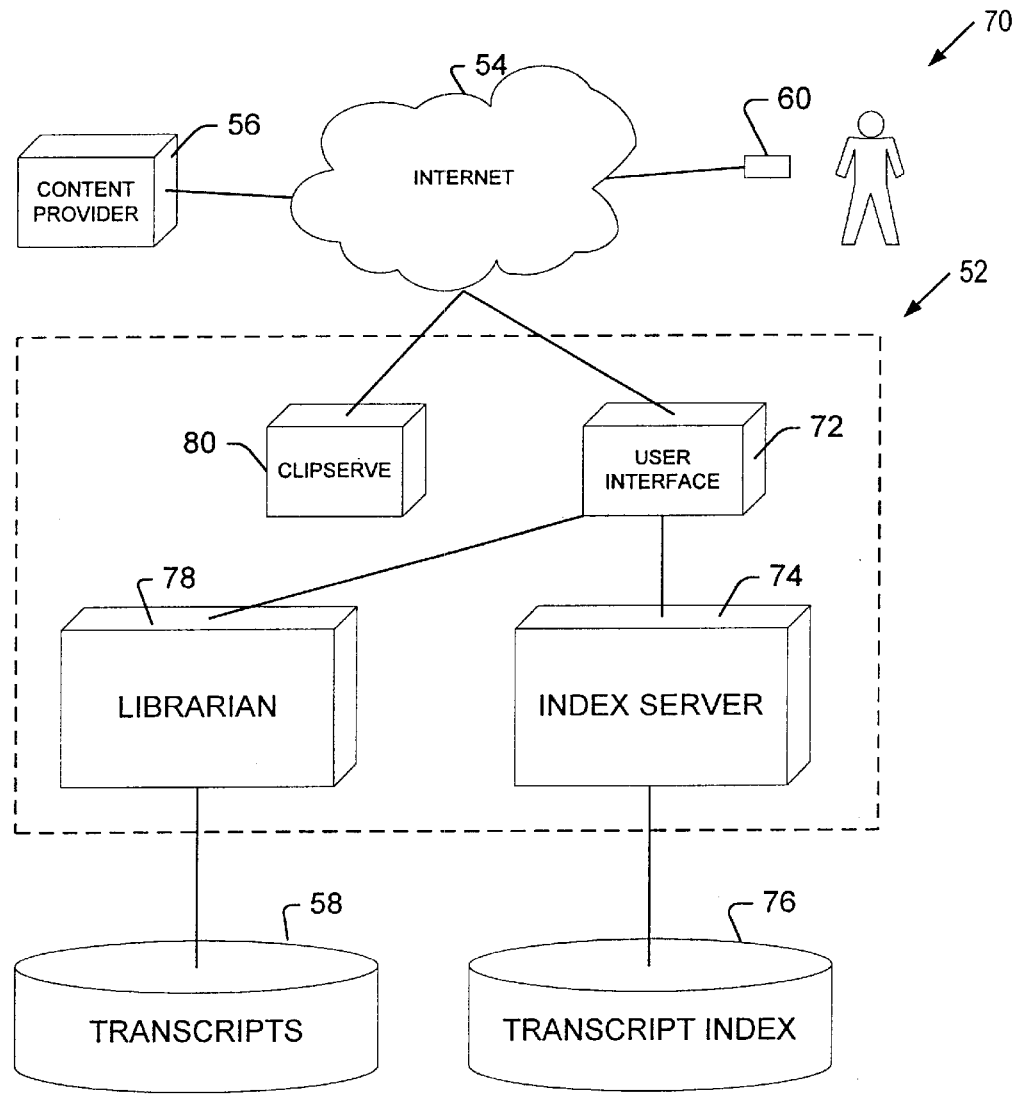
FIG. 2 is a block diagram illustrating a search engine used in a system for retrieving relevant regions of documents according to an exemplary embodiment of the present invention.

FIG. 2 illustrates the search engine 52 of a system 70 for retrieving relevant regions of documents according to an exemplary embodiment of the present invention. A user enters a raw query through the Internet 54 to the search engine 52, using a personal computer 60. Once the raw query has been entered, the user interface 72 pre-processes the query, removing stop terms such as "the" and "of" from the query. Any term occurring frequently throughout the transcript database 58 may be treated as a stop term. The frequency of occurrence which would result in a term being treated as a stop term may be determined by any suitable means, such as the setting of an arbitrary threshold frequency. Any term exceeding such a threshold would be treated as a stop term. According to an exemplary embodiment of the present invention, any term contained in the raw query occurring in more than 170,000 locations throughout the transcript database 58 is excluded as a stop term and removed from the query. The user interface 72 then converts any numerical phrases or acronyms included in the raw query into a standardized form to be used in the search query. In an exemplary embodiment, the user interface 72 is a CGI program running on an Apache web server running on a Compaq Tru64 UNIX operating system.

The search query is then transmitted to an index server 74 through a cleartext socket interface. In an exemplary embodiment the index server 74 runs on the same computer as the user interface 72. In an alternative embodiment, the index server 74 and the user interface 72 communicate through a TCP/IP network. The index server 74 searches the transcript index 76 for documents (i.e. transcripts) containing at least one term in the search query. The index server 74 then ranks and selects the 200 most relevant documents using the valuation process described in greater detail below. A complete description of the method used for conducting the index search as used in the exemplary embodiment is provided in U.S. Pat. No. 5,765,149, assigned to the assignee of the present invention, and fully incorporated herein. The index server 74 then transmits the identity of the 200 most relevant documents to the user interface 72.

The user interface 72, then accesses the 200 most relevant transcripts found by the index server 74, through the librarian 78. The librarian 78 transmits the 30 word regions of each transcript selected by the index server 74, corresponding to each query search term, to user interface 72. The index server 74 then selects the 20 most relevant regions using the regional valuation method described in greater detail below with respect to FIG. 5. The user interface 72 accesses the Uniform Resource Locator (URL) of the selected regions documents through the librarian 78. The user interface 72 transmits the selected regions and associated URLs to the personal computer 60 for display to the user.

Streaming media associated with a selected region may be requested by a user through the Clipserv CGI program 80. This request is conveyed through the personal computer 60 over the Internet 54 to the Clipserv 80. In response, the Clipserv 80 sends a MIME message corresponding to the selected region or document through the Internet 54 to the personal computer 60. The computer 60 then conveys the MIME message to a content provider 56. The content provider 56 then transmits the selected streaming media to the user' personal computer 60. In an exemplary embodiment, the Clipserv CGI program runs on the same computer as the user interface 72.

Figure 3:
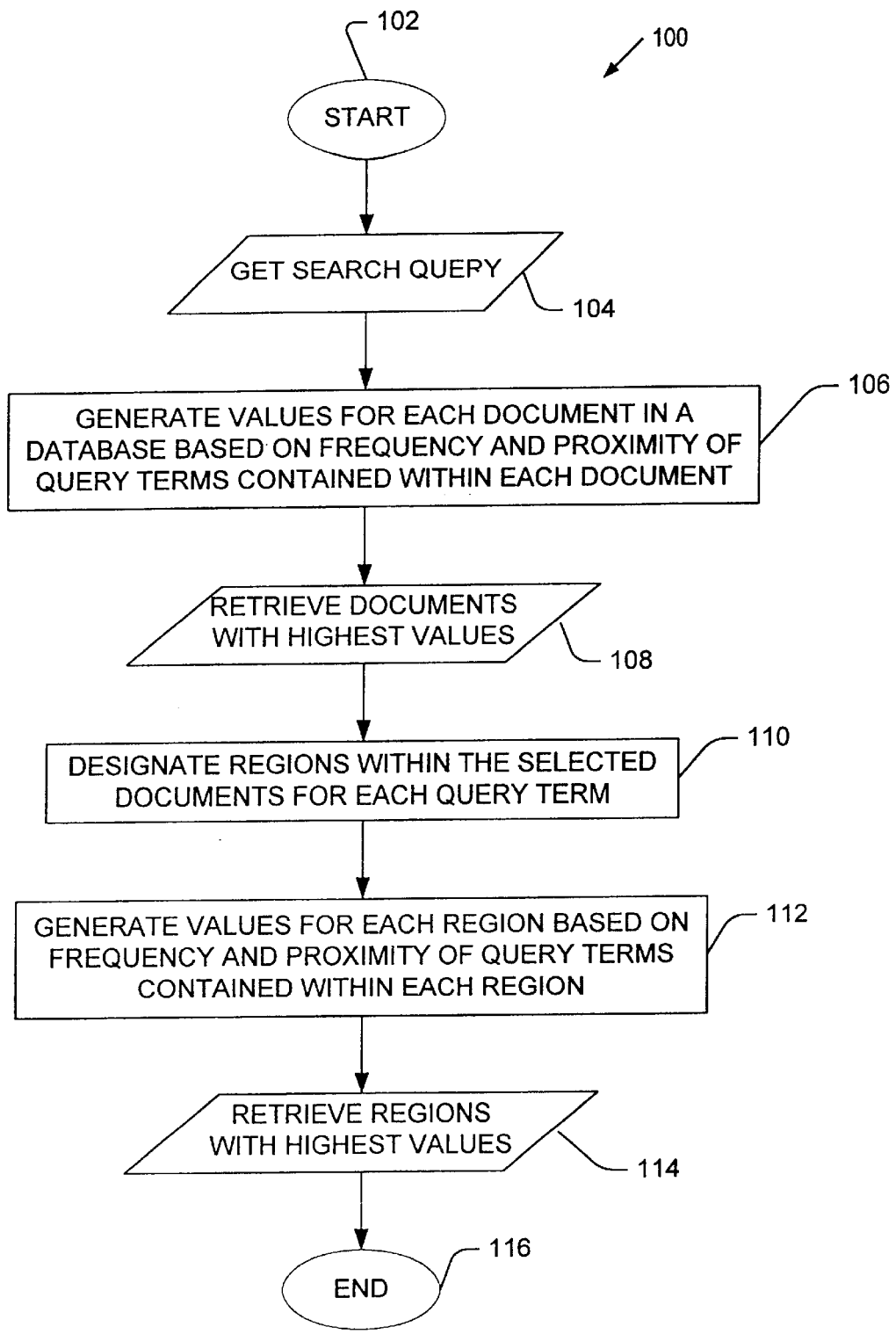
FIG. 3 is a flow chart illustrating the a method for retrieving relevant regions of documents according to the present invention.

FIG. 3 illustrates a method for retrieving relevant regions of documents according to an exemplary embodiment of the present invention. The document retrieval process 100 begins at step 104, where the search engine 52 (FIG. 1) receives a search query from the user. Step 104 includes receiving a query containing search terms relating to information that the user is seeking. According to the present invention, a phrase within quotations is treated as a single search term. Terms included in a user query may be discarded or standardized in the actual search query to facilitate a more effective search.

In the next step 106 of the process, transcript documents contained in the database are assigned document relevance values determined in response to the query. Documents containing a large number of query search terms receive a relatively higher document relevance value. Documents containing distinct query search terms grouped in relatively close proximity to each other within the document receive an even higher document relevance value. This document ranking process is discussed in greater detail below with respect to FIG. 4.

In step 108 of the process, the search engine selects the documents having the highest document relevance values for retrieval. In an exemplary embodiment, the search engine retrieves the 200 highest ranked documents. Although described as retrieving the highest ranked 200 documents, the specific number of documents retrieved may be selected by the user.

In step 110 of the process, a region is defined for each occurrence of a query search term in each document. In an exemplary embodiment, a region is defined for each occurrence of a search term beginning with the occurring search term and including the following 30 words of the document.

In step 112 of the process, values are generated for each region based on the frequency and proximity of query search terms contained within each region. This determination of values is discussed in greater detail below with respect to FIG. 5.

In step 114 of the process, those regions of documents having the highest values are retrieved for display to the user. In one embodiment of the present invention, regions having the 20 highest relevance values are retrieved and displayed. In an exemplary embodiment of the present invention the regions having the 20 highest relevance values not within 30 words of a higher valued region are retrieved and displayed.

In an alternative embodiment of the present invention, the 20 highest valued regions of each selected document not within a minimum distance of a higher valued region are selected. The minimum distance being a function of the number of words contained in each region, the number of regions being retrieved and the distance between the first and last hits in the document. The 20 highest valued regions from all selected documents are then displayed to the user.

Figure 4:
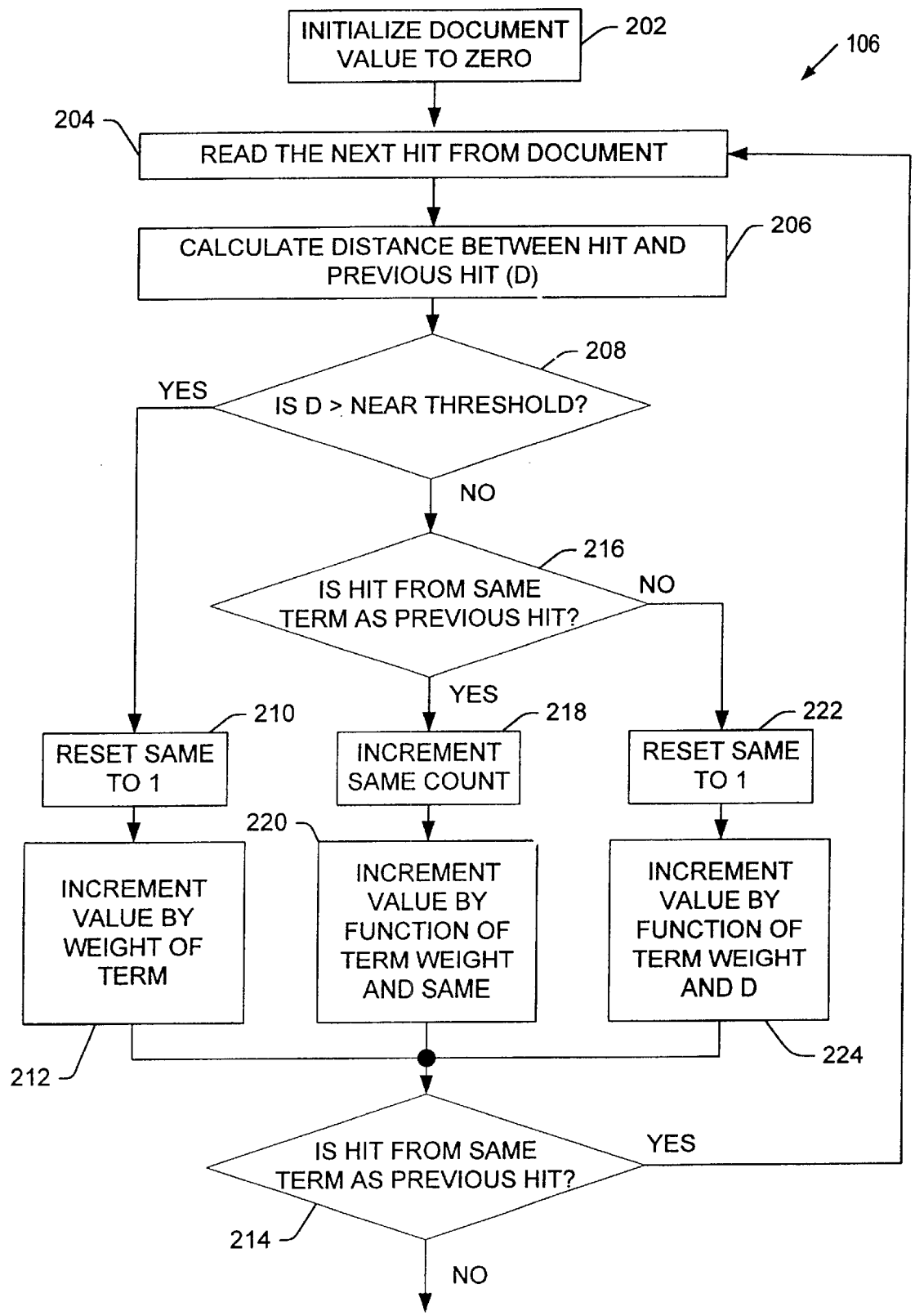
FIG. 4 is a flow chart illustrating the method for assigning a value to a document which reflects that document's relevance to a search query.

FIG. 4 illustrates a method for assigning a value to a document which reflects that document's relevance to a search query. Referring to FIG. 4, the process 106 begins at step 202, where a document's initial value is set to zero. In step 204, the document is searched until a word matching one of the query terms is located in the document. This word is hereinafter referred to as a hit. Each query term has a predetermined weight. The weight of a term is based on the terms frequency within the document database, with rarer terms being given higher weights.

In step 206, the distance (D) between the current hit and a previous hit is determined, where D is the number of words separating the previous hit and the current hit. In the case of the first hit, in which there would be no previous hit, D is set to infinity. The process then progresses to step 208, where it is determined if the distance between the previous hit and the current hit greater than a near threshold value. In an exemplary embodiment of the present invention, the near threshold value is 30 words. In the case of the first hit in the document, the distance (D) is set to infinity and is therefore always greater than the near threshold value. If the distance (D) is greater than the near threshold value the process then proceeds to step 210. In step 210 the same term counter (SAME) is reset to a value of 1 and the process proceeds to step 212. In step 212 the relevance value of the document is increased by an increment equal to the weight of the hit term.

Next, the process proceeds to step 214, where it is determined if more hits are contained in the document, and if there are more hits, the process returns to step 204, where the next hit contained in the document is read. If there are no more hits contained in the document the process begins again at step 202 with the next document. When there are no more documents the process proceeds to step 108 (FIG. 3), where the document having the next highest score is retrieved.

If D is less than or equal to the near threshold value, the process continues to step 216 where it is determined whether the current hit and the previous hit are identical terms, and if so the process continues to step 218. In step 218 the same term counter (SAME) is increased by one and the process continues to step 220. In step 220 the document relevance value is increased by an amount equal to a function of the current term weight and the value of the same term counter (SAME). In an exemplary embodiment the document relevance value is increased by the term weight divided by SAME. The process then continues to step 214.

If it is determined at step 216 that the current hit and the previous hit are distinct terms, the process proceeds to step 222. In step 222 the same term counter (SAME) is reset to 1, and the process continues to step 224. In step 224 the document relevance value is increased by an amount determined as a function of the current term weight and D. In an exemplary embodiment, the document relevance value is increased by an amount equal to the weight of the previous hit multiplied by the weight of the current hit divided by $(1+\log_2 D)$.

Figure 5:
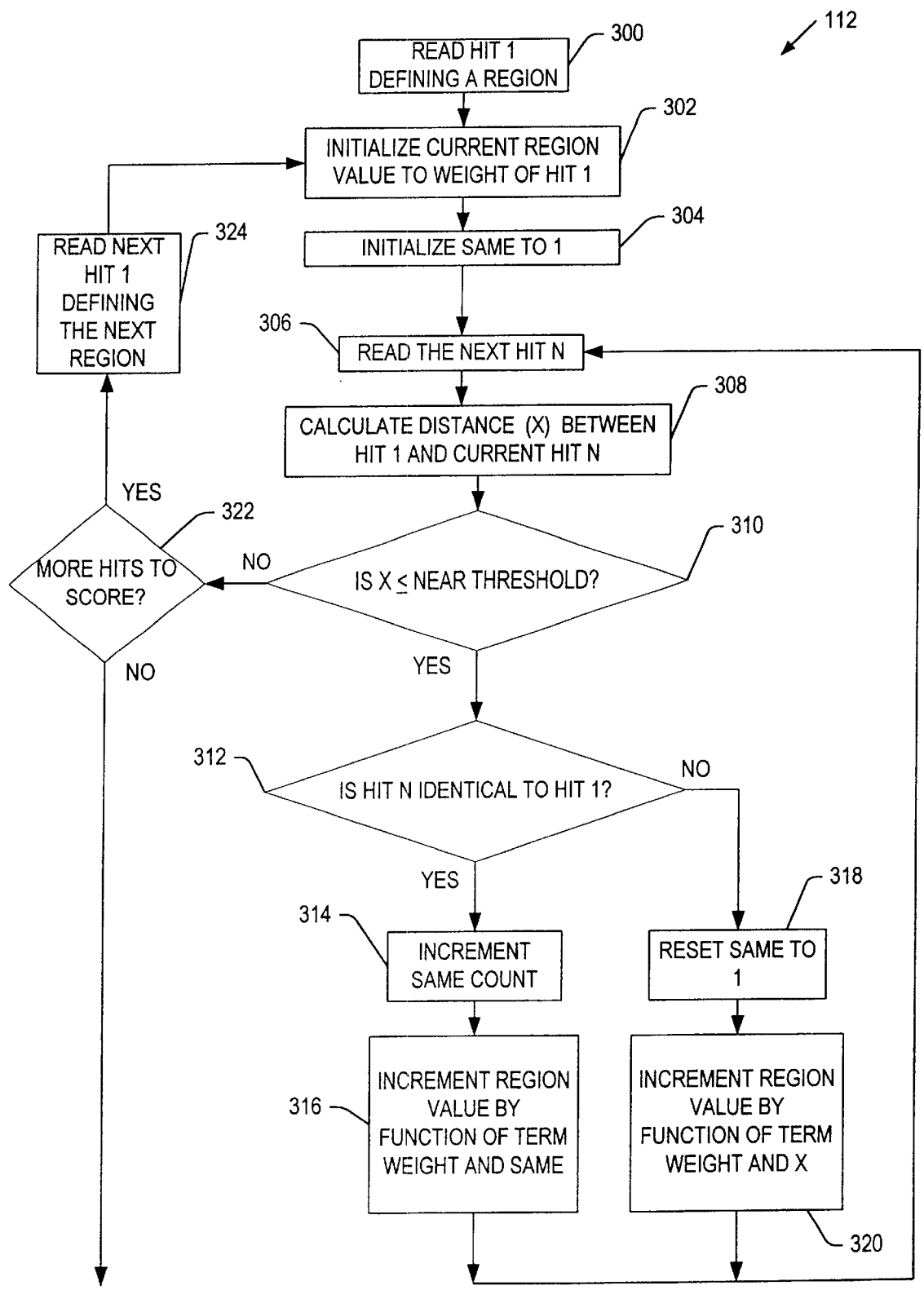
FIG. 5 is a flow chart illustrating the method for assigning a value to a region of a document which reflects that region's relevance to a search query.

FIG. 5 illustrates a method for assigning a value to a region of a document which reflects that region's relevance to a search query. Referring to FIG. 5, the process begins at step 300 where a query term (HIT 1) defining a region is read. According to an exemplary embodiment of the present invention a region is defined as a query term occurring in a selected document and the 30 words immediately succeeding the query term. The 30 words immediately succeeding a query term is hereinafter referred to as the near threshold value. In an alternative embodiment the near threshold value assigned any whole number value. In step 302, the initial relevance value of the region defined by HIT 1 (HIT 1 and 30 words subsequent to HIT 1) is set equal to the weight of the HIT 1 term. In step 304, the identical term counter (SAME) is set to 1. In step 306, the next query term occurring in the document is read and assigned to the variable HIT N. In step 308, the distance (X) between HIT 1 and HIT N is determined. Proceeding to step 310, the determination is made whether X is less than or equal to the near threshold value. If X is less then or equal to the near threshold value, the process continues to step 312.

At step 312 a determination is made whether HIT N is identical to HIT 1. If HIT N is identical to HIT 1, the process proceeds to step 314. In step 314, the identical term counter (SAME) is increased by 1. Next, in step 316, the regions relevance value is increased by an amount determined as a function of the weight of HIT 1 and the value of the identical term counter (SAME). In an exemplary embodiment, the regions relevance value is increased by the weight of HIT 1 divided by SAME. The process then returns to step 306, where the next query term is read.

If HIT N is not identical to HIT 1, the process proceeds to step 318, where the identical term counter (SAME) is reset to 1. In step 320 the current region's relevance value is increased by a function of the weight of HIT N and X. In an exemplary embodiment, a region's relevance value is increased by the weight of HIT 1 multiplied by the weight of HIT N/$(1+\log_2 X)$. The process then returns to step 306, where the next query term occurring in the document is read.

Referring back to step 310, if X is greater than the near threshold value, the process proceeds to step 322, where a determination is made as to whether more query terms are contained in the document. If more query terms are present within the document, the process proceeds to step 324. At step 324 the query term immediately succeeding the previous HIT 1 is read and replaces the previous HIT 1, and then the process returns to step 302, where the next region relevance value will be initially set at the weight of the new HIT 1. In this fashion a new region is defined by the new HIT 1 and the process is repeated for every query term occurring throughout the documents selected for intra-document searching. A region will overlap with a previous region if the term defining the succeeding region is less than the near threshold value.

If there are no more query terms contained in the document, the process continues to step 114 (FIG. 3) where the documents (regions) having the highest relevance values are retrieved and displayed to the user.

Figure 6:
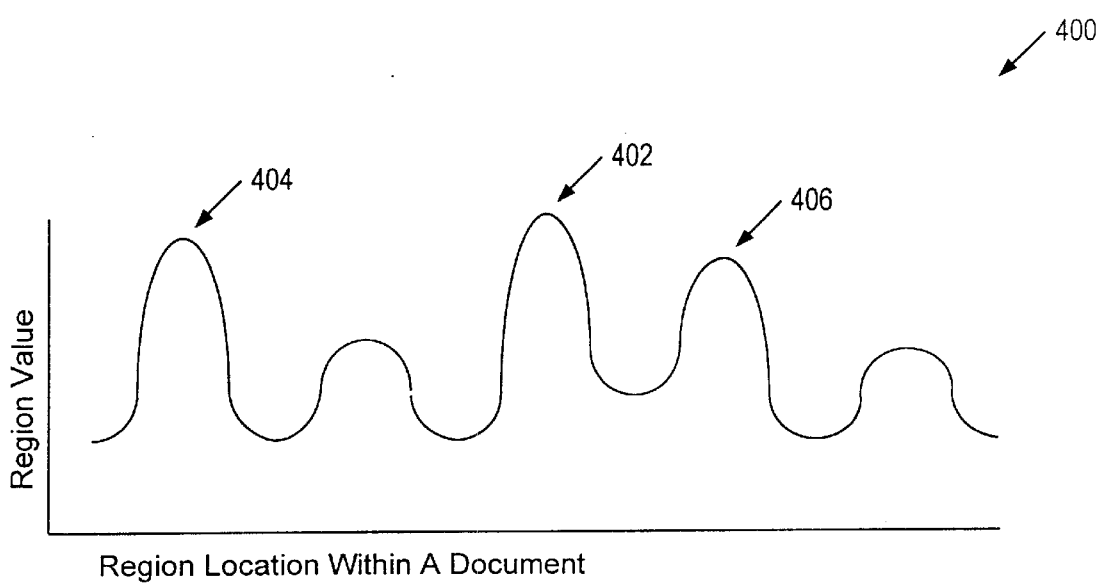
FIG. 6 is a graph illustrating a typical distribution of region relevance within a document.

FIG. 6 is a graph illustrating a distribution of region relevance within a document after being analyzed by the quantifying method of the present invention. A relevance value is determined for each query term occurring in a document. Regions may over lap if query terms occur within a near threshold as previously discussed. As shown in FIG. 6, regions 402, 404, 406 of the document have the highest relevance values.

In one embodiment, only the regions indicated by the peaks 402, 404, 406 are considered in determining the most relevant regions within a document, with regions occurring within a predetermined number of words of the peak region being discarded. In an exemplary embodiment, regions occurring within 30 words of a peak region are discarded. The selected regions are provided to the user in descending order of relevance. Thus, as illustrated in FIG. 6, region 402 would be displayed first, followed by region 404, and finally region 406.

The above detailed description of the invention is presented for the purposes of illustration and description. Although the present invention has been described with respect to several specific embodiments, various changes and modifications may be suggested to persons of ordinary skill in the art, and it is intended that the present invention encompass such changes and modifications as fall within the scope of the claims appended hereto.

What is claimed is:

1. A method for finding and ranking regions of documents responsive to a query, comprising the steps of:
   providing a query relating to information sought by a user, the query including one or more than one search term;
   searching for a document responsive to said query;
   determining a first value for each document responsive to the query, each first value indicating the relevance of its associated document with respect to the query;
   selecting documents in response to the first value;
   defining a region within each of the selected documents for each occurrence of any of the search terms found within that document by defining each of the regions to include the found search term and a predetermined number of words following that search term, wherein the predetermined number is a near threshold value and wherein said near threshold value is a whole number value; and
   determining a second value for each region ranking that region by its relevance to the query.

2. The method of claim 1, wherein the step of determining the first value associated with each document responsive to the query includes
   assigning a higher value to documents containing more than one of the found search terms.

3. The method of claim 1, wherein the step of defining a region within each of the selected documents includes
   defining each regions to include a fixed number of words before and a fixed number of words after each found search term.

4. The method of claim 1, further including the step of:
   displaying at least one region of at least one document in order of relevance.

5. The method of claim 1, wherein the predetermined number of words is defined as a near threshold value of 30 words.

6. The method of claim 1, wherein the step of determining the first value associated with each document responsive to the query includes
   increasing the first value of documents including multiple instances of a search term or multiple search terms.

7. The method of claim 1, wherein the regions are defined in associated with a near threshold value, and wherein the step of determining the first value associated with each document responsive to the query includes
   searching within that document for any additional instances of a found search term, and
   determining proximity between the found search term and its other instances, if found, wherein the near threshold value is relevant to the proximity.

8. The method of claim 1, wherein the regions are defined in associated with a near threshold value, and wherein the step of determining the second value associated with each region of the document responsive to the query includes
   searching within that region for any additional instances of a found search term,
   determining proximity between the found search term and its other instance, if found, wherein the near threshold value is relevant to the proximity; and
   generating the second value for that region based on frequency and the proximity of search terms contained therein search terms.

9. The method of claim 1, wherein the step of determining the second value associated with each region of the document responsive to the query includes
   locating within that region any additional instances of search terms found within that region,
   determine proximity of instances of the found search term, assigning to that region a value relevant to the proximity,
   locating within that region other search terms contained in the query, and
   determining the second value based on frequency and the proximity of search terms contained within that region.

10. The method of claim 1, wherein the documents being searched are stored in at least one database with transcripts of audio recordings.

11. The method of claim 10, wherein the transcripts of audio recordings are created by voice recognition software.

12. A method for quantifying the relevance of intra-document search results responsive to a query, comprising the steps of:
   providing a query containing at least one search term;
   search for at least one document responsive to at least one search term contained in the query;
   assigning a first value to each document responsive to at least one search term contained in the query indicating the relevance of the document;
   selecting documents in response to the first value;
   defining at least one region within the selected documents corresponding to a selected one of the search terms by defining each of the regions to include the selected one of the search terms and a predetermined number of words following that search term wherein the predetermined number is a near threshold value and wherein said near threshold value is a whole number value; and assigning a second value to each region responsive to at least one search term contained in the query indicating the relevance of the region.

13. The method of claim 12, wherein the step of assigning the first value includes assigning a higher value to documents containing more than one of the search terms.

14. The method of claim 12, further including the step of:

providing at least one database containing documents.

15. The method of claim 12, wherein the step of defining regions within the documents, each region corresponding to a selected one of the search terms, further includes defining the regions to include the selected search term and a variable region proximate to the selected search term, parameters of which are determined by a user.

16. The method of claim 12, wherein the step of assigning the region second value increasing the second value of regions including multiple instances of a search term.

17. The method of claim 12, wherein the step of assigning the second value to a region includes locating within that region any additional instances of respected ones of selected search terms, determining proximity of selected ones of respective search term, and assigning the second value to that in relation to the proximity.

18. The method of claim 12, wherein the step of assigning the second value includes locating within that region any additional instances of respected ones of selected search terms;

determining proximity of selected ones of respective search term, assigning the second value to that region indicative of the proximity, locating within that region selected ones of other search terms contained in the query; and increasing the second value by an increment indicative of the relevance of the selected ones of other search terms.

19. An apparatus for finding and ranking portions of documents responsive to a query, comprising:

a user interface for receiving a query relating to information sought by a user, wherein the query contains at least one search term; and a processor for assigning a value to each document responsive to at least one search term contained in the query indicating the relevance of the document and selecting documents in response to the value, the processor operative to define regions within the selected documents, wherein each region corresponds to a selected one of the search terms and wherein each region is defined to include the selected one of the search terms and a predetermined number of words following that search term, wherein the predetermined number is a near threshold value and wherein said near threshold value is a whole number value, the processor operative to assign a second value to each of the regions responsive to at least one search term contained in the query indicating the relevance of the region.

20. An apparatus of claim 19, further including:

a display device for displaying at least one region of at least one document in order of relevance.

21. A method for quantifying the relevance of intra-document search results responsive to a query, comprising:

searching, in response to a query with one or more search terms, for a document containing any one of the search terms;

determining a document relevance value for each document containing one or more of the search terms;

selecting a group of documents from among the documents containing one or more of the search terms that, based on the document relevance value, are most relevant to the query;

searching through each document in the selected group of documents for further occurrences of search terms hit upon or any additional search terms from the query;

defining a region within each document in the selected group or documents where each occurrence of a search term is located by defining each of the regions to include the located search term and a predetermined number of words following that search term, wherein the predetermined number is a near threshold value and wherein said near threshold value is a whole number value;

determining for each region a region relevance value that ranks it by its relevance to the query; and providing regions that are most relevant to the query.

22. The method of claim 21, wherein the document relevance value rises with the rise in incidence of search terms from the query, be it a plurality of distinct search terms, a plurality of instances of the same search term, or a combination thereof.

23. The method of claim 21, wherein the document relevance value rises for documents containing distinct search terms grouped within a close proximity.

24. The method of claim 21, wherein the most relevant documents rank highest in their respective document relevance value.

25. The method of claim 21, there being a same-term counter for counting recurring instances of the same search term, wherein each search term is associated with a weight, and wherein each documents relevance value is determined as a function of the weight and the same-term counter.

26. The method of claim 21, wherein the region relevance value for each region is determined based of frequency and proximity of search terms found therein.

27. The method of claim 21, there being a same-term counter for counting recurring instances of the same search term, wherein the region relevance value for each region is determined as a function of the same-term counter.

28. A system for quantifying the relevance of intra-document search results responsive to a query, comprising:

means for searching, in response to a query with one or more search terms, for a document containing any one of the search terms;

means for determining a document relevance value for each document containing one or more of the search terms;

means for selecting a group of documents from among the documents containing one or more of the search terms that, based on the document relevance value, are most relevant to the query;

means for searching through each document in the selected group of documents for further occurrences of search terms hit upon or any additional search terms from the query;

means for defining a region within each document in the selected group or documents where each occurrence of a search term is located by defining each of the regions to include the located search term and a predetermined number of words following that search term, wherein the predetermined number is a near threshold value and wherein said near threshold value is a whole number value;

means for determining for each region a region relevance value that ranks it by its relevance to the query; and means for providing regions that are most relevant to the query.

29. The system of claim 28, wherein the document relevance value rises with the rise in incidence of search terms from the query, be it a plurality of distinct search terms, a plurality of instances of the same search term, or a combination thereof.

30. The system of claim 28, wherein the document relevance value rises for documents containing distinct search terms grouped within a close proximity.

31. The system of claim 28, wherein the most relevant documents rank highest in their respective document relevance value.

32. The system of claim 28, there being a same-term counter for counting recurring instances of the same search term, wherein each search term is associated with a weight, and wherein each documents relevance value is determined as a function of the weight and the same-term counter.

33. The system of claim 28, wherein the region relevance value for each region is determined based on frequency and proximity of search terms found therein.

34. The system of claim 28, there being a same-term counter for counting recurring instances of the same search term, wherein the region relevance value for each region is determined as a function of the same-term counter.

* * * * *